US008066236B2

(12) United States Patent (10) Patent No.: US 8,066,236 B2
Peterson et al. (45) Date of Patent: Nov. 29, 2011

(54) OPTICAL EQUIPMENT MOUNTING DEVICES AND SYSTEMS

(75) Inventors: Morris Peterson, Earlysville, VA (US); Charles Robert Overbey, Jr., Deland, FL (US)

(73) Assignee: Ashbury International Group, Inc., Ruckersville, VA (US)

( * ) Notice: Subject to any disclaimer, the term of this patent is extended or adjusted under 35 U.S.C. 154(b) by 603 days.

(21) Appl. No.: 11/559,888

(22) Filed: Nov. 14, 2006

(65) Prior Publication Data

US 2007/0164177 A1 Jul. 19, 2007

Related U.S. Application Data

(60) Provisional application No. 60/736,129, filed on Nov. 14, 2005.

(51) Int. Cl.
*F16M 11/02* (2006.01)
(52) U.S. Cl. ................... 248/178.1; 248/187.1
(58) Field of Classification Search ............. 248/177.1, 248/178.1, 186.1, 187.1, 176.3, 183.1, 183.2; 396/419, 428
See application file for complete search history.

(56) References Cited

U.S. PATENT DOCUMENTS

| | | | | | |
|---|---|---|---|---|---|
| 2,543,352 | A | * | 2/1951 | Brown | 248/183.2 |
| 2,630,520 | A | * | 3/1953 | McDaid | 362/219 |
| 2,667,825 | A | * | 2/1954 | Nicholas | 396/428 |
| 2,713,609 | A | * | 7/1955 | Niklason | 348/373 |
| 2,882,790 | A | * | 4/1959 | Broms | 355/62 |
| 3,270,652 | A | * | 9/1966 | Mason et al. | 355/63 |
| 3,709,119 | A | * | 1/1973 | Van Der Meer | 396/428 |
| 3,742,835 | A | * | 7/1973 | Bahnsen | 396/419 |
| 4,222,540 | A | * | 9/1980 | King et al. | 248/205.1 |
| 5,035,487 | A | | 7/1991 | Herz | |
| 5,140,470 | A | | 8/1992 | Luecke | |
| 5,381,758 | A | * | 1/1995 | Simon | 119/537 |
| 5,470,037 | A | * | 11/1995 | Willis | 248/125.9 |
| 5,863,209 | A | * | 1/1999 | Kim | 434/428 |
| 6,304,393 | B1 | | 10/2001 | Sechrist et al. | |
| 7,021,592 | B2 | * | 4/2006 | Brandes | 248/181.2 |
| 7,027,097 | B2 | * | 4/2006 | Zadok | 348/375 |

FOREIGN PATENT DOCUMENTS

JP 2005148330 6/2005

OTHER PUBLICATIONS

International Search Report and Written Opinion for corresponding PCT Application No. PCT/US2006/060893 dated Sep. 20, 2007.

* cited by examiner

*Primary Examiner* — A. Joseph Wujciak, III
(74) *Attorney, Agent, or Firm* — Troutman Sanders LLP; Robert R. Elliott, Jr.

(57) ABSTRACT

Optical equipment mounting devices and systems are provided. In an embodiment of the present invention an optical mounting system can generally comprise a mounting assembly to carry an optical device and a support coupled to the mounting assembly. The mounting assembly can include a generally horizontal platform and can define a vertical axis passing substantially orthogonal to said horizontal platform. The support can be adapted to hold an optical device below the generally horizontal platform of the mounting assembly and to one side of the vertical axis. An optical mounting system can also comprise an adjustment mechanism capable of precisely adjusting the position of the optical device in small increments. Other embodiments are also claimed and described.

11 Claims, 6 Drawing Sheets

OPTICAL EQUIPMENT MOUNTING DEVICES AND SYSTEMS

CROSS REFERENCE TO RELATED APPLICATION

This patent application claims priority to and the benefit of U.S. Provisional Application No. 60/736,129, entitled "Tripod Mounting For Optical Equipment", filed on 14 Nov. 2005, which is incorporated herein by reference in its entirety as if fully set forth below.

TECHNICAL FIELD

The various embodiments of the present invention relate generally to devices and systems for mounting optical equipment, and more specifically, to optical equipment mounting devices and systems that provide a stable mounting platform on which multiple optical devices can be integrated and configured for use to reduce a user's exposure.

BACKGROUND

Many people have long utilized firearms to shoot projectiles of various sorts. For example, military personnel, law enforcement officers, hunters, and precision target shooters use different types of firearms (or weapons platforms) for different purposes. Usually, people use firearms, in conjunction with an optical sight, or other pieces of optical equipment. Optical equipment can assist users in acquiring precision aim on a target and in determining whether or not an identified item is actually a correct or proper target.

Numerous types of optical equipment using visual various assistance technologies exist. Example types include optical sights, infrared imagers, thermal imagers, illumination lasers, spotting lasers, radio frequency devices, cameras, and the like. As those skilled in the art will understand other visual assistance technologies also exist. While each of these technologies has advantages and can greatly assist a user, they can have drawbacks relative to each other. For example, thermal imaging is beneficial of locating potential targets but is limited in actually helping a user discern one potential item from another as can an optical sight. As can be appreciated, firearm users always want to be certain of a target prior to operating their firearms.

To use a visual assistance technology, users typically locate use an optical device in concert with a firearm. For example, an optical sight (such as a scope) can be directly coupled to a firearm. In other applications, users may desire or require visual assistance devices separate from a firearm. For example, some applications may have an optical device, such as a thermal imager, as a stand alone piece of equipment. In this instance, the separate optical device can also be mounted or securely affixed to a stand or support to enable beneficial use.

Current mounting devices that hold or support optical devices, while serving their respective purposes, have certain drawbacks. These drawbacks include that various pieces of optical device can not be substantially co-located or integrated with a single mounting device. Such non-integration requires separate pieces of equipment to be used rather than incorporation multiple optical devices on a single mounting device or support.

Other drawbacks include that current mounting devices are configured such that the optical devices are mounted in a top-mounted configuration. As can be appreciated, such top-mounted configurations can have undesirable balancing affects on a stand or support thus increasing tendency of tipping of a mounting device. A top-mounted configuration also requires a user to operate a visual assistance device at an unsafe height from the ground which may make the user visible to potential targets thereby possibly endangering a user and drawing enemy fire or unwelcome attention.

Still yet current conventional mounting devices and systems do not enable fine tuning and adjustments of an optical device to enable precise adjustments of a visual assistance device to increase a user's success of hitting a target. Rather, current mounting devices and systems typically utilize handles that are not designed to provide a user fine control of the positioning of optical devices.

Accordingly, there is a need for optical equipment mounting devices and systems that enable co-location and use of multiple types of optical devices, provide sound structural support having good balance properties, and have a low height from a ground surface to assist keeping a user hidden from a potential target. In addition, there is a need for improved optical equipment mounting devices and systems that enable the ability to fine tune with great precision the alignment of an optical device. It is to the provision of such optical equipment mounting devices and systems that the various embodiments of the present invention are directed.

BRIEF SUMMARY

The various embodiments of the present invention provide optical equipment mounting devices and systems. Some embodiments enable co-location of multiple pieces of optical equipment such that users can advantageously use multiple pieces of optical equipment. These multiple pieces can be securely attached on or integrated with the same stand, support, or tripod in a co-located fashion. This enables the use of a plurality of optical equipment pieces with a single support stand. Some embodiments of the present invention also enable a bottom-mount configuration to provide a low height optical device system having good stability characteristics. Indeed, a low height optical device system can also have an associated low center of gravity thereby contributing to the overall stability of the optical device system.

While various embodiments of the present invention may be described with reference for use with firearms in various military applications, other applications are also contemplated and possible. Indeed, various embodiments of the present invention can be used in any application where a user utilizes an optical device for assistance in viewing items. Such applications can include, but are not limited to, photography, hunting, surveying, bird watching, stargazing, surveillance, and the like. Thus, it should be kept in mind that the various embodiments of the present invention has many beneficial and useful applications in a wide variety of fields.

Broadly described, some optical mounting system embodiments of the present invention can generally comprise a support defining a vertical axis and a mounting assembly coupled to the support. The mounting assembly can be adapted to carry an optical device. The mounting assembly can also assembly comprise a generally horizontal platform. The optical device can be disposed below the generally horizontal platform and to one side of the vertical axis. Also, the mounting assembly can be substantially situated on the one side of the vertical axis. The support can support the mounting assembly and the optical device, and in some embodiments, the support can be a tri-pod type support. Other support types can be used in other embodiments.

An optical mounting system can also comprise an adjustment mechanism that can be in communication with the mounting assembly to adjust at least one of a vertical position and a horizontal position associated with the optical device. An adjustment mechanism can be integrated with one of the support and the mounting assembly, and the adjustment mechanism can alter the position of the optical device relative to the support. An optical mounting system can comprise a second optical device coupled to the mounting assembly so that the optical device and the second optical device are collocated. The mounting assembly can be adapted to rotate about the vertical axis and the horizontal platform can be adapted to rotate relative to the vertical axis to enable movement of the optical device.

In another other optical mounting device embodiments of the present invention, the embodiments can generally comprise a platform and a support coupled to the platform. The platform can define a horizontal plane and can comprise a plurality of coupling devices to hold a plurality of optical devices. At least one of the coupling devices can be located below the horizontal plane. The support can support the platform above a surface. The support can comprise an adjustment mechanism to adjust at least one of a horizontal or vertical position of the optical devices. The support can also define a vertical axis, and the coupling devices can be situated on a same side of the vertical axis. The support can also comprise a main vertical body coupled to a plurality of legs. The platform and the support can be manufactured from substantially non-magnetic materials.

Other features are also possible in accordance with some embodiments of the present invention. For example, an adjustment mechanism can comprise an input knob coupled to a threaded screw to adjust the horizontal or vertical positions of one or more optical devices in increments corresponding to a pitch associated with the threaded screw. In addition, a coupling device can be located above a horizontal plane of a platform such that one of the optical devices are situated above and blow the platform. Also, a coupling device can be located on a side of the platform so that one of the optical devices is mounted on the side of the platform. Sample coupling devices or mechanisms can include rail attachments, screws, threaded inserts, and the like.

According to still yet other embodiments of the present invention optical equipment mounting systems using a tripod and at least one tactically mounted optical device can comprise a mounting assembly. The mounting assembly can include a generally horizontal platform. The platform can include at least one coupling mechanism to carry at least one optical device below the generally horizontal platform and to one side of a vertical axis of a tripod. The generally horizontal platform can be substantially disposed to the one side of the vertical axis of the tripod. An optical equipment mounting system can also comprise an adjustment device to adjust at least one of the horizontal and vertical position of the at least one optical device. An adjustment device can be configured to adjust the at least one of the horizontal and vertical position of the at least one optical device in angular increments. Also, a mounting assembly can include a second coupling mechanism to carry a second optical device on a side edge of the horizontal platform.

Other aspects and features of embodiments of the present invention will become apparent to those of ordinary skill in the art, upon reviewing the following description of specific, exemplary embodiments of the present invention in conjunction with the accompanying figures.

DETAILED DESCRIPTION OF PREFERRED & ALTERNATIVE EMBODIMENTS

Referring now to the figures, wherein like reference numerals represent like parts throughout the several views, exemplary embodiments of the present invention will be described in detail. Throughout this description, various components may be identified having specific values or parameters, however, these items are provided as exemplary embodiments. Indeed, the exemplary embodiments do not limit the various aspects and concepts of the present invention as many comparable parameters, sizes, ranges, and/or values may be implemented.

Figures 1, 2:
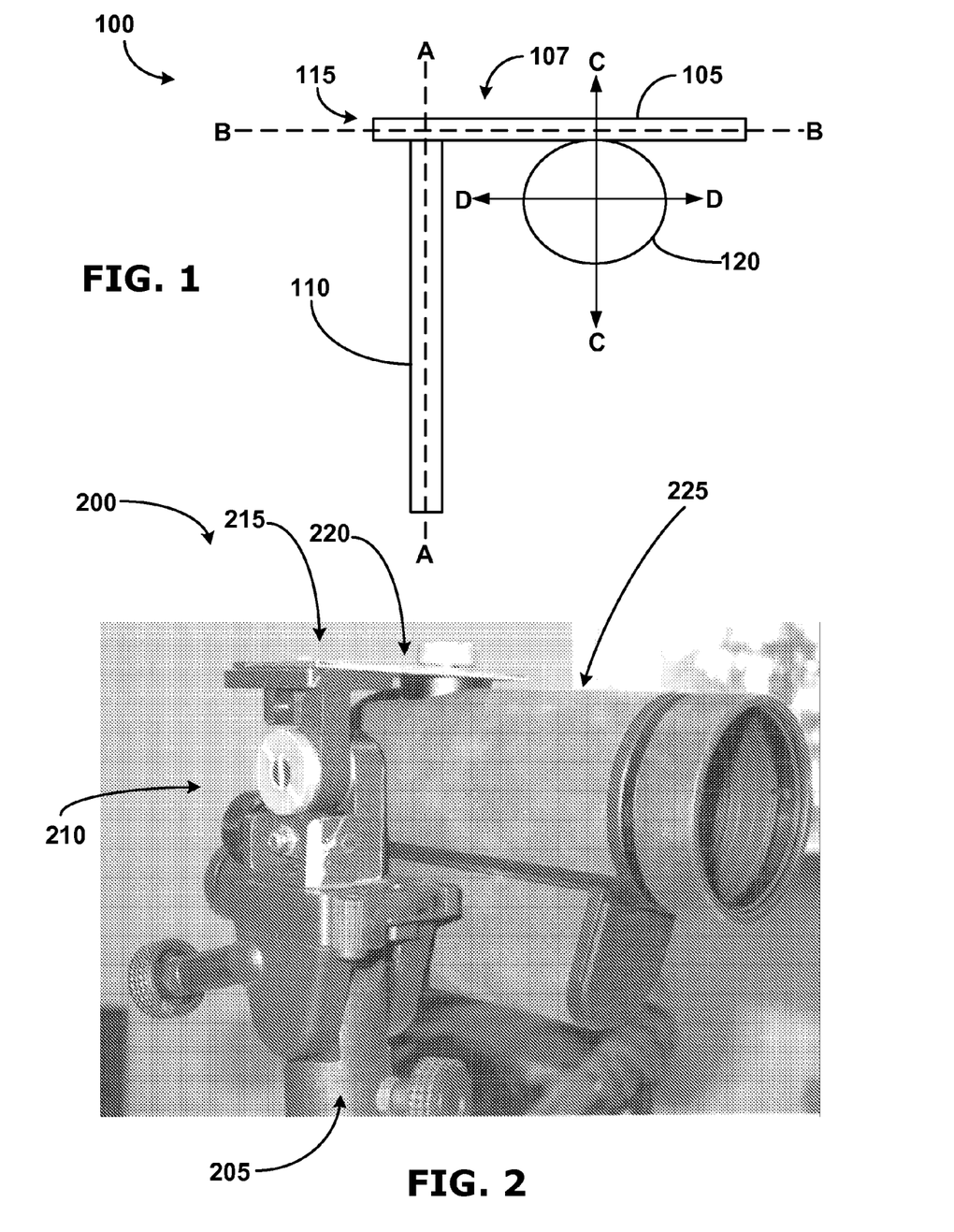
FIG. 1 illustrates a schematic representation of an optical mounting system according to some embodiments of the present invention.
FIG. 2 illustrates an embodiment of an optical mounting device according to some embodiments of the present invention that is shown as holding an optical device.

Turning now specifically to the figures, FIG. 1 illustrates a schematic representation of an optical mounting system 100 according to some embodiments of the present invention. As shown, system 100 generally comprises a mounting assembly 105 to carry an optical device 120. The mounting assembly can be supported by a support 110. An adjustment mechanism 115 can be disposed between the mounting assembly 105 and the support 110. The adjustment mechanism 115 can be used to adjust the position of the mounting assembly 105 relative to the support 110. As will be discussed in greater detail below, the adjustment mechanism 115 can be a separate component or can be integrated with the mounting assembly 105 or the support 110 in accordance with the various embodiments of the present invention. Thus, it should be understood that these components can be utilized in a variety of configurations in accordance with the various embodiments of the present invention.

As shown in FIG. 1, the components of system 100 have certain characteristics. For example, the support 110 generally defines an axis A-A and the mounting assembly 105 generally defines line B-B located between the ends of mounting assembly 105. Axis A-A can be substantially orthogonal to one or more of the mounting assembly 105 of line B-B depending on the position of the mounting assembly 105. The mounting assembly 105 can be coupled to support 110 via an adjustment mechanism 115 or can be coupled in different manners. For example, is the adjustment mechanism 115 is integrated with either the mounting assembly 105 of support 110, the mounting assembly 105 can be directly coupled to support 110. The mounting assembly 105 can include a generally horizontal platform 107 having a horizontal surface substantially parallel to the line B-B.

As depicted, the mounting assembly 105 is carrying or supporting an optical device 120. The optical device 120 can be any device used to enhance or provide assistance to a user in viewing or in locating or identifying something of interest or at a distance. For example, such devices include, but are not limited to, optical sights, infrared imagers, thermal imagers, illumination lasers, spotting lasers, radio frequency devices, angle cosign indicators and the like. Preferably, one or more optical devices, such as optical device 120, are adapted to be coupled to mounting assembly 105. Advantageously, this feature of various embodiments of the present invention enables such devices to be collocated such that a user can use multiple optical devices and can benefit from the different associated collocated optical devices.

The optical device 120 is preferably securedly attached to horizontal platform 107 but optical device 120 can also be permanently attached to horizontal platform 107. Secure attachment enables optical device 120 to be easily attached to and removed from the mounting assembly 105. As shown, optical device 120 is positioned to one side of axis A-A and below line B-B. This advantageous of various embodiments of the present invention enables a lower overall height of system 100 thereby reducing a user's exposure to other potential observers and providing a low center of gravity. As those ordinarily skilled in the art will appreciate, people and objects that are positioned close to a surface (such as the ground) have lower exposure from being seen by other potential observers, such as enemy troops or hostile observers.

As mentioned above, adjustment mechanism 115 can be used to adjust the position of the mounting assembly 105 relative to the support 110. Movement of the mounting assembly 105 can also move optical device 120 that may be attached to the mounting assembly 105. For example, movement can take place such that the vertical inclination of the optical device 120 moves along line C-C and horizontal movement takes place along line D-D. Such an advantageous feature may be desired to account for wind, parallax, long distances, or other factors that may affect a user's use of optical devices attached to mounting assembly 105. As discussed below in greater detail, adjustment mechanism 115 is preferably a precise adjustment mechanism that enables adjustment of horizontal and/or vertical positions in very small, fine increments. Certain embodiments may only utilize an adjustment mechanism 115 configured to enable precise vertical positioning of an optical device 120. Precise adjustment of an optical device can enable very fine adjustments and positioning of attached optical devices (such as optical device 120) for a user's benefit. In accordance with some embodiments of the present invention, the adjustment mechanism may be calibrated to move approximately 6 degrees vertically and/or horizontally in response to one full rotation of an input knob.

FIG. 2 illustrates an embodiment of an optical mounting device 200 according to some embodiments of the present invention that is shown as holding an optical device. As shown, device 200 generally comprises a support 205, an adjustment mechanism 210, a mounting assembly 215 having a horizontal platform 220, and an optical device 225. As shown, the optical device 225 is mounted beneath the horizontal platform 220 and offset from a central axis of the support. The adjustment mechanism 210 is shown in this embodiment as a stand alone component disposed between the support 205 and the mounting assembly. In this embodiment of the present invention, the adjustment mechanism 210 can be utilized to make a fine vertical adjustment of the optical device 225 to alter its vertical inclination as discussed in more detail with reference to FIGS. 6 and 7.

Figure 3:
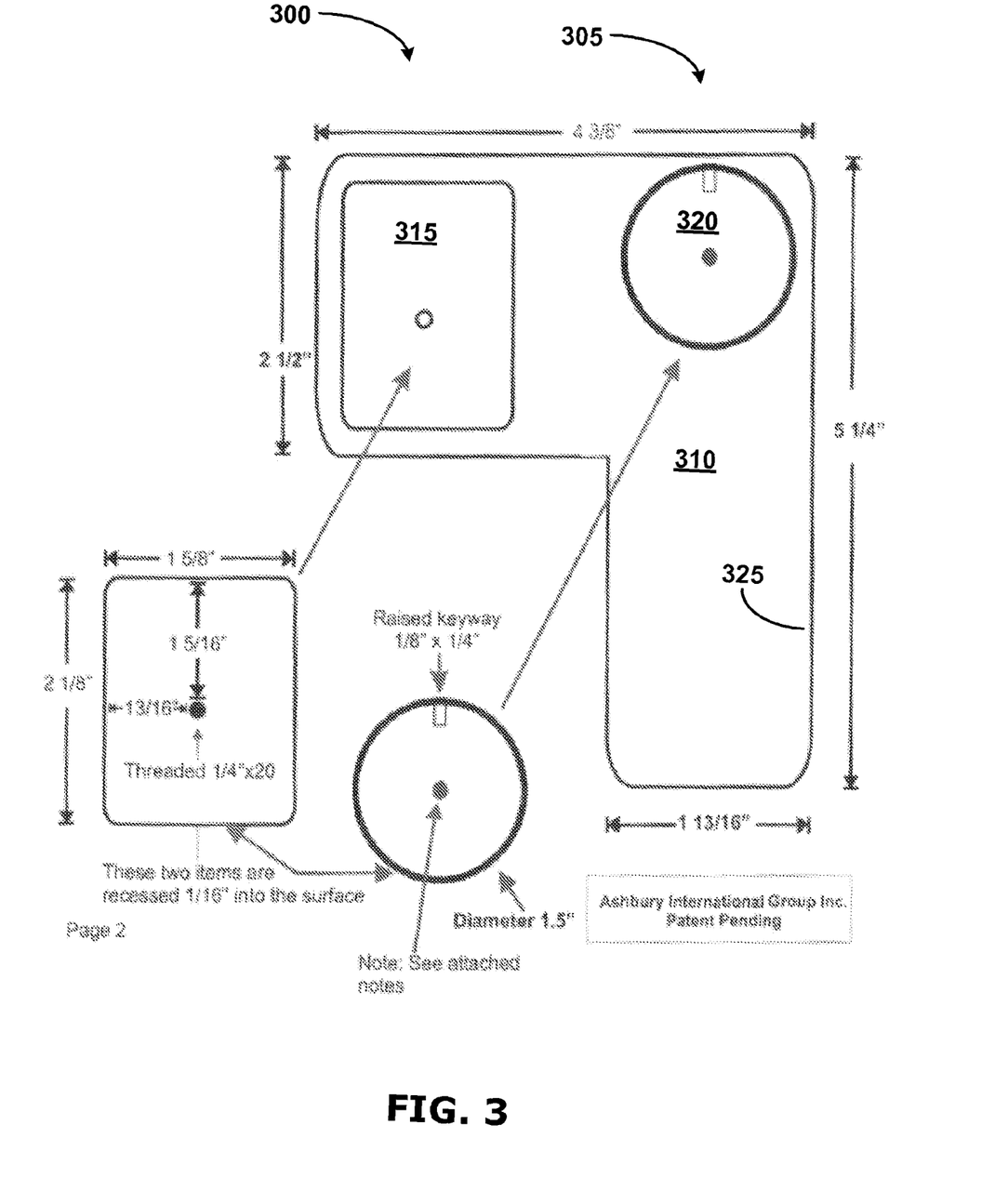
FIG. 3 illustrates a bottom view of a mounting interface assembly embodiment used in accordance with some embodiments of the present invention.

FIG. 3 illustrates a bottom view of a mounting interface assembly 300 embodiment used in accordance with some embodiments of the present invention. The terms mounting interface assembly, mounting interface, and interface mount may be used interchangeably herein. As shown, the mounting interface 300 generally comprises a platform 305 and a surface 310. The mounting interface 300 can also comprise various recesses or regions for attachment to other components. For example, a first recess 315 can be used for coupling to an adjustment mechanism and a second recess 320 can be used for supporting, carrying, or coupling to an optical device. The mounting interface 300 can have various physical dimensions and shapes. As shown in FIG. 3, the interface 300 has a generally L-shaped. Other shapes are possible in accordance with the various embodiments of the present invention. For example, the mounting interface 300 may have a polygonal or circular shape.

The first and second recesses 315, 320 can have various characteristics as shown in FIG. 3. For example, the first and second recesses 315, 320 can comprise various holes (threaded and unthreaded) for receiving attachment devices (screws and/or threaded shafts). In addition, the first and second recesses 315, 320 can be variously shaped. As shown, first recess 315 is generally shaped as a rectangle with a first dimension of approximately 2⅛ inches and a second dimension of approximately 1⅝ inches. The second recess 320 can be shaped as a circle having a diameter of approximately 1½ inches. While not shown, the surface 310 may have additional recess and regions for coupling additional items and optical devices. For example, a Picatinny 1913 Rail may be positioned along surface 310 or along side 325 such that the rails are substantially perpendicular to surface 310.

Figure 4:
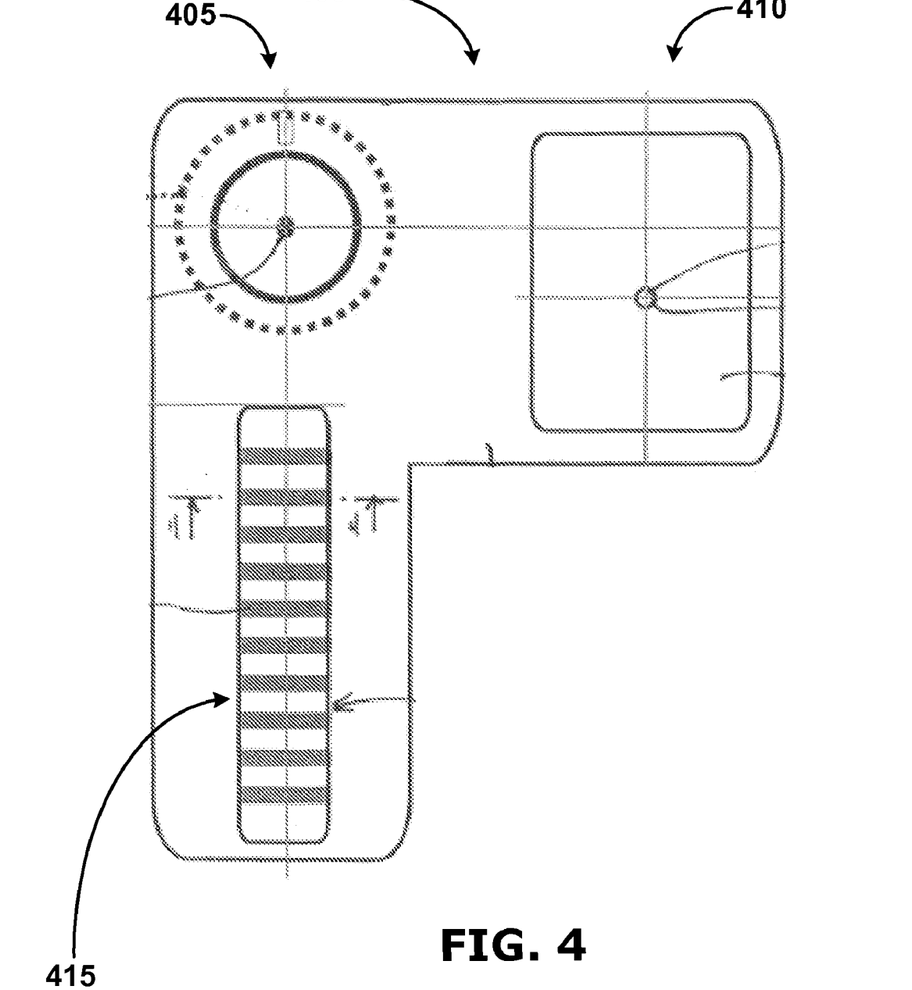
FIG. 4 illustrates a top view of a mounting interface assembly embodiment used in accordance with some embodiments of the present invention.

FIG. 4 illustrates a top view 400 of a mounting interface assembly 300 embodiment used in accordance with some embodiments of the present invention. As can be seen by comparing FIG. 3 and FIG. 4, the top and bottom views of mounting interface both show portions corresponding to the first and second recesses 315, 320. In FIG. 4 these are first area 405 and second area 410. Screws and other attachment means may be inserted through apertures located in the first area 405 and the second area 410 to enable items, such as one or more optical devices and an adjustment mechanism, to be securely attached to mounting interface 300. Preferably the mounting interface assembly 300 is manufactured from Aluminum or other non-magnetic materials so that the operation of compass-type optical devices or other magnetic based optical devices are not disturbed.

Figure 5:
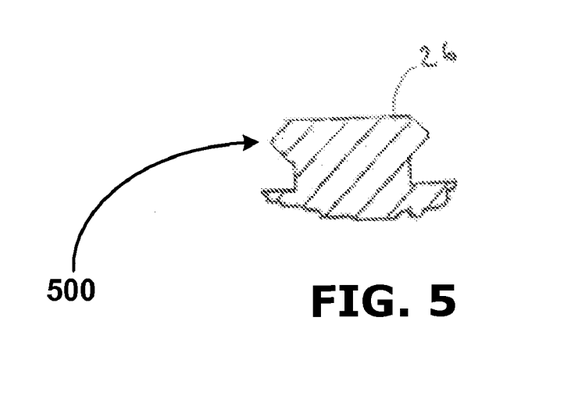
FIG. 5 illustrates a cross-sectional view of an attachment rail utilized in accordance with some embodiments of the present invention.

As shown mounting assembly 300 may also have an attachment rail 415, such as a Picatinny 1913 Rail, positioned on the interface 300's top surface 401. FIG. 5 illustrates a cross-sectional view 500 of the attachment rail 415. In accordance with a preferred embodiment of the present invention, the attachment rail is a Military Specification 1913 Picatinny Attachment Rail. Those skilled in the art will understand that the 1913 Picatinny Rail is a multi-purpose interface rail attachment system that provides a standardized mounting platform. Optical devices such as sights, scopes, tactical lights, cameras, and laser sighting modules an be attached using such a rail attachment systems.

Figure 6:
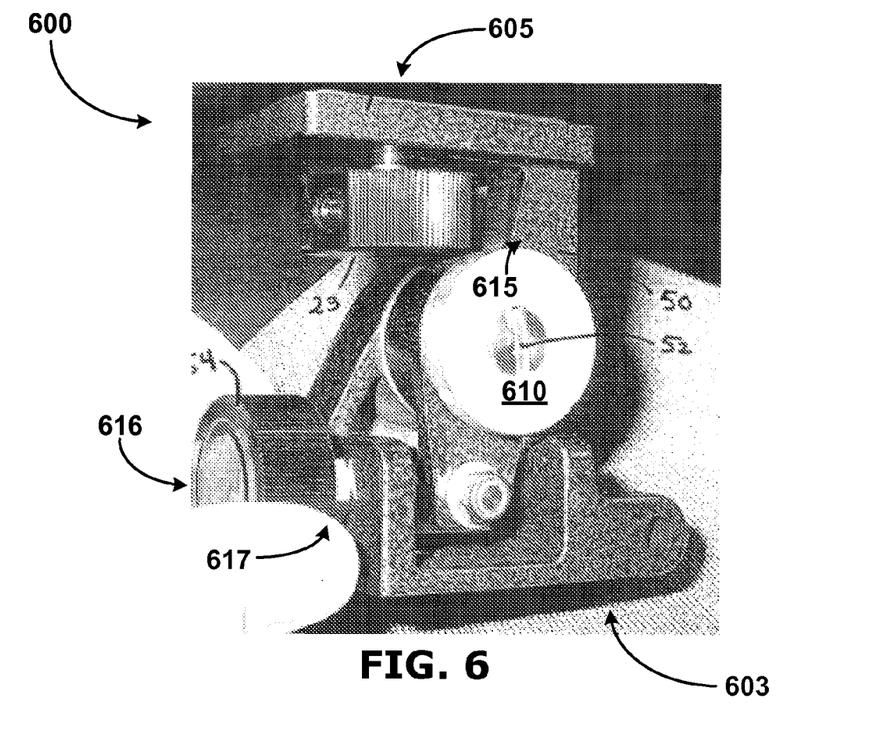
FIG. 6 illustrates a perspective view of an adjustment mechanism that can be used to adjust the position of an optical device in accordance with some embodiments of the present invention.

FIG. 6 illustrates a perspective view of an adjustment mechanism 600 that can be used to adjust the position of an optical device in accordance with some embodiments of the present invention. As shown, the adjustment mechanism 600 generally comprises a first lever 605 that can rotate about a rotary axis 610. The adjustment mechanism 600 can also comprise a base 603 can be affixed to a support, such as support 205 shown in FIG. 2. The first lever 605 includes an interface surface 615 for attachment to a mounting interface, such as mounting interface 300, depicted in FIGS. 3 and 4.

The adjustment mechanism 600 also generally comprises an input knob 616 that is coupled to an input screw 617 which connects internally within the adjustment mechanism 600. Input screw 617 interacts with a threaded insert (not shown) of first lever 605 such that rotation of the input screw 617 moves within the threaded insert of first lever 605 to move the first lever 605. Thus, rotation of the input knob 616 can cause the first lever 605 to rotate about rotary axis 610 thereby causing the interface surface 615 to change position. This in turn causes items attached to the interface surface 615, such as mounting interface 300 and an optical device, to have a corresponding position change. For example, a position change can occur vertically and/or horizontally according to the various embodiments of the present invention. By making the thread pitch of the input screw 617 very short, the incremental adjustments of the adjustment mechanism 600 can be very fine and precise thereby enabling a very precise adjustment. In accordance with some embodiments of the present invention, the adjustment mechanism 600 may be calibrated such that a single full rotation of input knob 616 may cause a change of position of approximately 6 degrees. Other calibrations are also possible using various other thread pitches.

Figure 7:
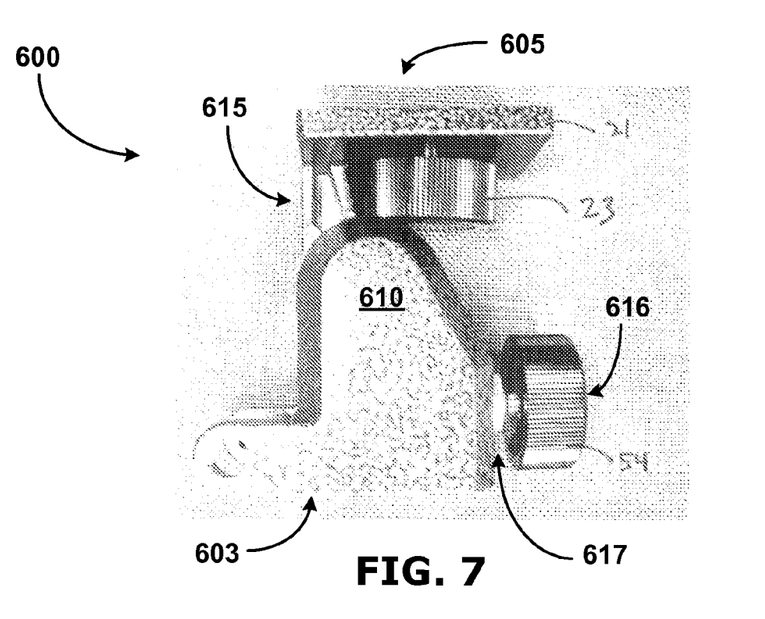
FIG. 7 illustrates a side view of the adjustment mechanism depicted in FIG. 6 that can be used to adjust the position of an optical device in accordance with some embodiments of the present invention.

FIG. 7 illustrates a side view of the adjustment mechanism 600 depicted in FIG. 6 that can be used to adjust the position of an optical device in accordance with some embodiments of the present invention. As mentioned above, the adjustment mechanism 600 can be used for both vertical and horizontal adjustments. Indeed, to effect a change in a horizontal direction, the adjustment mechanism can have an additional input knob (not shown) configured in a screw drive manner to enable optical devices connected to the interface surface 615 to rotate horizontally. Other types of horizontal/vertical positioning systems are contemplated and possible in accordance with the various embodiments of the present invention.

FIGS. 8-11 depict various embodiments of the present invention supporting one or more optical devices and attached to a support system. The support systems while not shown in their entirety can be tripod support systems. It should be understood, however, that other support systems can be utilized in accordance with the various embodiments of the present invention. For example, a support having one or more supporting legs can be used in accordance with the embodiments of the present invention. The support systems can also have additional features although not shown. For example, the support systems can have adjustable height features and be constructed of lightweight, sturdy materials and may have minimal ferro-magnetic properties.

Figure 8:
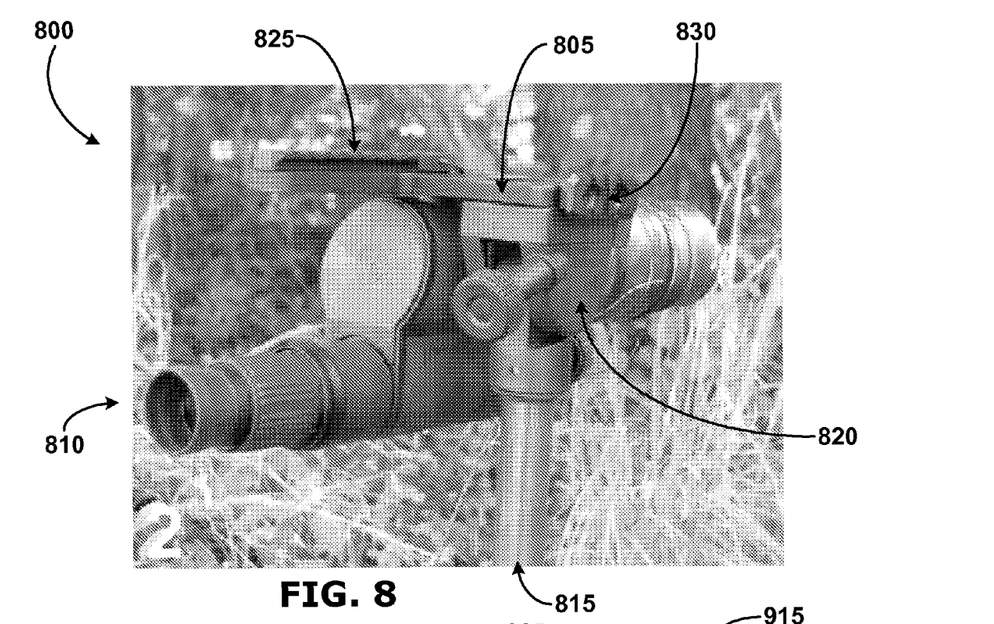
FIG. 8 illustrates an embodiment of the present invention in which an interface mounting assembly holds a spotting scope in a bottom-mount configuration and is supported by a support tripod.

FIG. 8 illustrates an embodiment of the present invention in which an interface mount assembly 805 holds a spotting scope 810 in a bottom-mount configuration and is supported by a support tripod 815. The spotting scope 810 is mounted on the underside of the interface mount assembly 805. As shown, the interface mount 805 is shown coupled to the support tripod 815. Also in this particular embodiment, an adjustment mechanism 820 is built into the support tripod 815 such that it is not a separate component. Other features illustrated include a rail attachment 825 located on top of the interface mount assembly 805 and side attachment mounts 830 located on the side of the interface mount.

Figure 9:
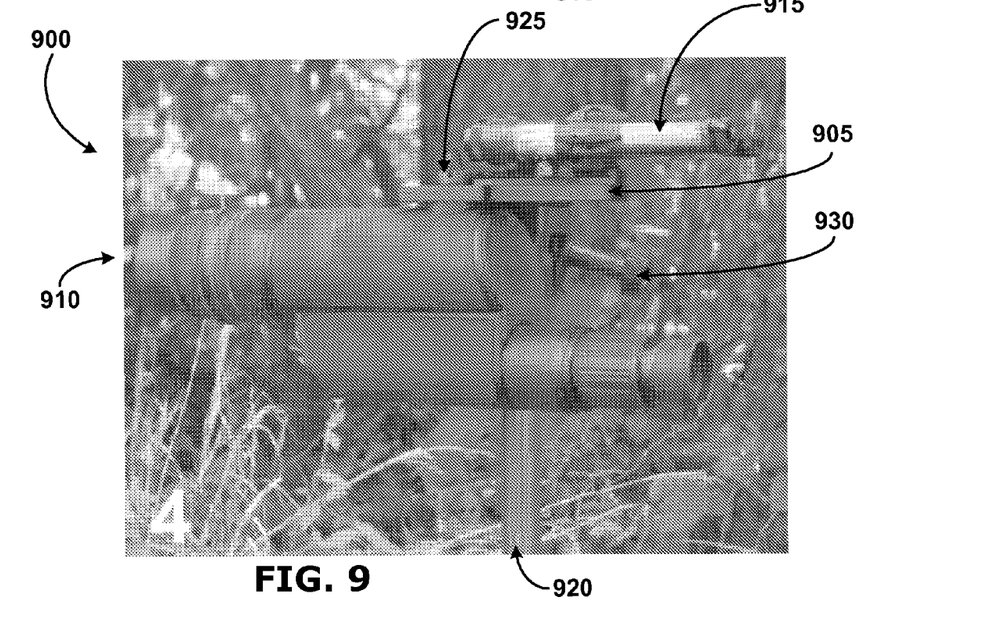
FIG. 9 illustrates an embodiment of the present invention in which an interface mounting assembly holds a spotting scope in a bottom-mount configuration, holds a laser pointer/illuminator, and is supported by a support tripod.

FIG. 9 illustrates an embodiment of the present invention in which an interface mounting assembly 905 holds a spotting scope 910 in a bottom-mount configuration, holds a laser pointer/illuminator 915 in a top-mount configuration, and is supported by a support tripod 920. In this particular embodiment, multiple optical devices are attached to the interface mounting assembly 905. This advantageous collocation feature enables a user to use multiple optical devices that are coupled to the interface mounting assembly 905. In this particular embodiment, the laser pointer/illuminator 915 is attached to the interface mounting assembly via an attachment rail, such as the Picatinny 1913 Rail. Also, the spotting scope 910 is shown in attached to the interface mounting assembly 905 via a screw attachment device 925 such that the spotting scope 910 can be detached from the mounting assembly 905. In this particular embodiment, an adjustment mechanism 930 is built into the support tripod 920 that enables fine position adjustments of the spotting scope 910 and the laser pointer/illuminator 915.

Figure 10:
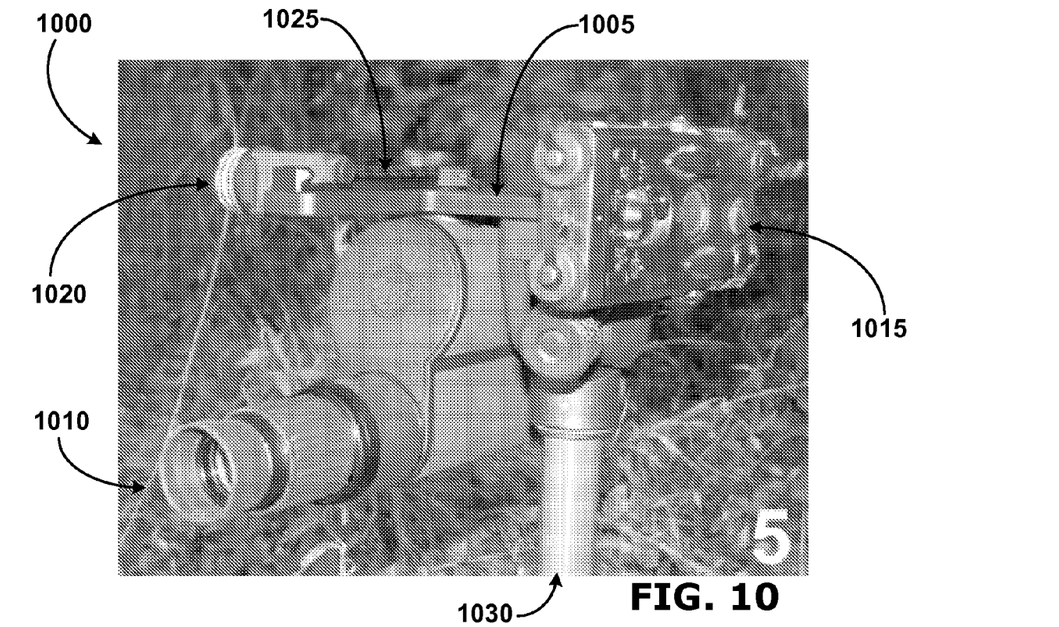
FIG. 10 illustrates an embodiment of the present invention in which an interface mounting assembly holds a spotting scope in a bottom-mount configuration, holds a laser pointer/illuminator in a side-mount configuration, supports an angle cosign indicator on an attachment rail, and is supported by a support tripod.

FIG. 10 illustrates an embodiment of the present invention in which an interface mounting assembly 1005 holds a spotting scope 1010 in a bottom-mount configuration, holds a laser pointer/illuminator 1015 in a side-mount configuration, supports an angle cosign indicator 1020 on an attachment rail 1025, and is supported by a support tripod 1030. In this embodiment, multiple optical devices are attached to interface mounting assembly 1005, but the spotting scope 1010 and the laser pointer/illuminator 1015 are located on opposing sides of an axis defined the support tripod 1030. This embodiment also includes an angle cosign indicator 1020 attached via a Picatinny 1913 Rail attachment system 1025. As those skilled in the art will understand, an angle cosign indicator can provide a user a shot angle to correct for gravitational force that can affect a projectile's trajectory during flight.

Figure 11:
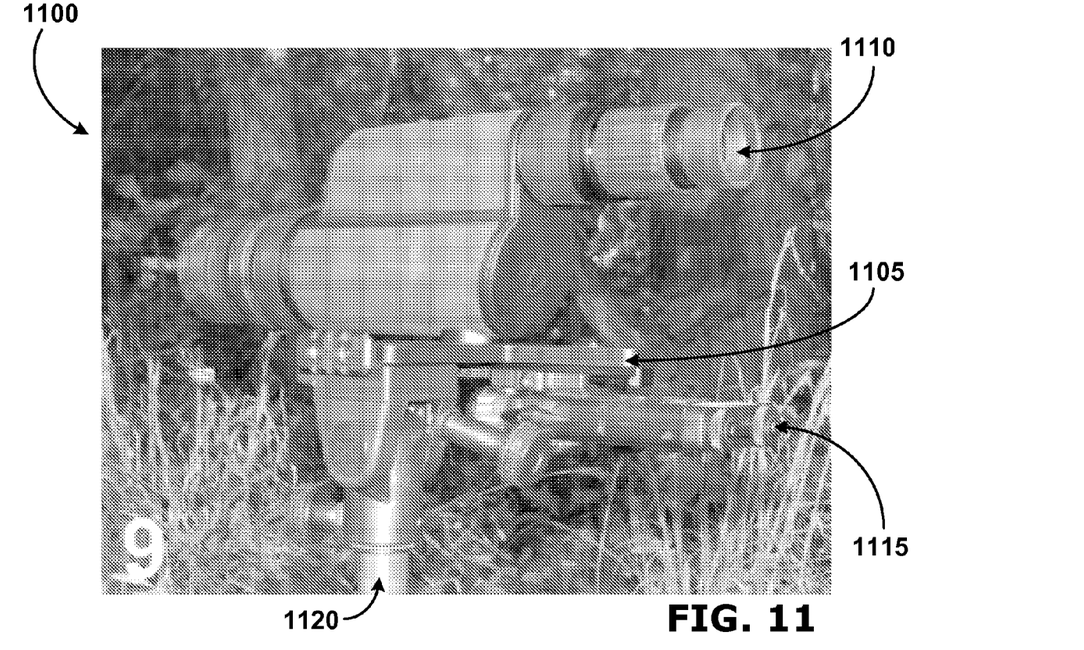
FIG. 11 illustrates an alternative embodiment of the present invention in which an interface mounting assembly holds a spotting scope in a top-mount configuration, holds a laser pointer/illuminator in a bottom-mount configuration, and is supported by a support tripod.

FIG. 11 illustrates an alternative embodiment of the present invention in which an interface mounting assembly 1105 holds a spotting scope 1110 in a top-mount configuration, holds a laser pointer/illuminator 1115 in a bottom-mount configuration, and is supported by a support tripod 1120. This embodiment also depicts multiple optical devices attached to an interface mounting assembly, although the spotting scope 1110 and the laser pointer/illuminator 1115 are attached to opposing sides of the interface mounting assembly 1105.

While the various embodiments of this invention have been described in detail with particular reference to exemplary embodiments, those skilled in the art will understand that variations and modifications can be effected within the scope of the invention as defined in the appended claims. Accordingly, the scope of the various embodiments of the present invention should not be limited to the above discussed embodiments, and should only be defined by the following claims and all equivalents.

We claim:

1. An optical mounting system comprising:
   a support defining a vertical axis;
   a mounting assembly comprising a generally horizontal platform, the mounting assembly adapted to carry an optical device in a position generally below the generally horizontal platform and to one side of the vertical axis; and
   an adjustment mechanism disposed between the support and the mounting assembly, the adjustment mechanism having opposed ends, one coupled to the support and another coupled to the mounting assembly, the adjustment mechanism comprising:
   a first adjustment element configured to adjust the vertical position of the mounting assembly; and
   a second adjustment element, comprising a screw drive, pivotally coupled to the first adjustment element configured to adjust the elevation of the mounting assembly;
   wherein turning the screw drive on the second adjustment element incrementally adjusts the elevation of the mounting assembly at a rate proportional to the thread pitch of the screw drive.

2. The optical mounting system of claim 1, wherein turning the screw drive one rotation corresponds to an elevation change of the mounting assembly of between approximately four and eight degrees.

3. The optical mounting system of claim 1, wherein the second adjustment element further comprises and adjustment knob coupled to the screw drive to enable adjustment of the elevation of the mounting platform.

4. The optical mounting system of claim 1, wherein the mounting assembly is configured to carry a second optical device in a position that is collocated with the first optical device, the mounting assembly being configured to carry the second optical device above the generally horizontal platform.

5. The optical mounting system of claim 1, wherein the adjustment mechanism comprises a lever portion and a base portion, the base portion being coupled to the support and the lever portion coupled to the mounting assembly, and wherein rotation of the second adjustment element alters the relative position between the lever portion and the base portion.

6. The optical mounting system of claim 5, the support being a tripod having a first end configured for coupling to the base portion of the adjustment mechanism.

7. The optical mounting system of claim 1, wherein the mounting assembly is adapted to rotate about the vertical axis and the horizontal platform is adapted to rotate about a horizontal axis to enable movement of the optical device.

8. An optical mounting system comprising:
   a platform defining a horizontal plane and comprising a plurality of coupling devices to hold a plurality of optical devices, wherein at least one of the coupling devices is located below the horizontal plane;
   at least one of the coupling devices being located above the horizontal plane such that at least one of the plurality of optical devices is enabled to be situated above the platform and at least one other of the plurality of optical devices is enabled to be situated below the platform at the same time; and
   a support coupled to the platform to support the platform above a surface, the support comprising a first adjustment mechanism to adjust an elevation of the platform enabling the platform to pivot about the support and a second adjustment mechanism to adjust a vertical position of the platform; wherein the second adjustment mechanism comprises an input knob coupled to a threaded screw and is configured to adjust the horizontal or vertical positions of the optical devices in increments corresponding to a thread pitch associated with the threaded screw.

9. The optical mounting system of claim 8, wherein the support defines a vertical axis and wherein the coupling devices are situated on a same side of the vertical axis.

10. The optical mounting system of claim 8, wherein the support comprises a main vertical body coupled to a plurality of legs.

11. The optical mounting system of claim 8, wherein the platform and the support are manufactured from substantially non-magnetic materials so that the operation of magnetic based optical devices is not affected by the platform and the support.

* * * * *